(12) United States Patent
Wakazono et al.

(10) Patent No.: US 8,727,462 B2
(45) Date of Patent: May 20, 2014

(54) MARKING HEAD AND MARKING DEVICE

(75) Inventors: Takehiko Wakazono, Takasago (JP); Mikio Kato, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 13/885,068

(22) PCT Filed: Dec. 6, 2011

(86) PCT No.: PCT/JP2011/006816
§ 371 (c)(1),
(2), (4) Date: May 13, 2013

(87) PCT Pub. No.: WO2012/093439
PCT Pub. Date: Jul. 12, 2012

(65) Prior Publication Data
US 2013/0229479 A1    Sep. 5, 2013

(30) Foreign Application Priority Data

Jan. 7, 2011   (JP) ................................ 2011-002453

(51) Int. Cl.
*B41J 2/325*    (2006.01)
*B60C 13/00*    (2006.01)
*G01M 1/26*     (2006.01)
*G01M 17/02*    (2006.01)

(52) U.S. Cl.
CPC ............... *B60C 13/00* (2013.01); *B60C 13/001* (2013.04); *G01M 1/26* (2013.01); *G01M 17/02* (2013.01)
USPC .......................................................... 346/141

(58) Field of Classification Search
CPC ......... G01M 1/26; G01M 17/02; B60C 13/00
USPC ............................ 346/76.1, 78, 139, 141, 171
See application file for complete search history.

(56) References Cited

FOREIGN PATENT DOCUMENTS

| JP | 5 52697 | 3/1993 |
| JP | 10 337847 | 12/1998 |
| JP | 2000 329658 | 11/2000 |
| JP | 3330939 | 10/2002 |
| JP | 2003 54123 | 2/2003 |
| WO | WO 92/22795 | * 12/1992 ............. G01M 1/26 |

OTHER PUBLICATIONS

International Search Report issued Feb. 7, 2012 in PCT/JP11/006816 filed Dec. 6, 2011.

* cited by examiner

*Primary Examiner* — Huan Tran
(74) *Attorney, Agent, or Firm* — Oblon, Spivak, McClelland, Maier & Neustadt, L.L.P.

(57) ABSTRACT

An inner peripheral surface of a tube-shaped inner casing has a regular hexagonal shape when viewed from the axial direction, a plurality of pins are arranged in the inner casing so as to take a posture parallel to the axial direction of the inner casing, and in this arrangement, a plurality of rows of the pins arranged in a predetermined direction are arranged in a direction perpendicular to the row direction of the pins, the adjacent pins of the adjacent rows are offset from each other in the row direction of the pins, and each pin contacts the pins adjacent thereto.

6 Claims, 3 Drawing Sheets

MARKING HEAD AND MARKING DEVICE

TECHNICAL FIELD

The present invention relates to a marking device which performs marking on a tire subjected to a performance test and a marking head including the same.

BACKGROUND ART

Marking is performed on a tire subjected to a performance test using a tire testing machine. In this marking, a heated marking pin presses a thermal transfer tape against the tire, so that a desired mark is printed on the tire by a thermal transfer method.

This marking is performed on a smooth surface of a side wall of the tire. However, the smooth surface decreases in area as the shape of the side wall becomes complicated in recent years. Further, the area of the smooth surface is small even in the side wall of the flat tire or the like. When the marking position is not smooth but uneven, the thermal transfer tape is sufficiently pressed against the convex portion, but the thermal transfer tape is not sufficiently pressed against the concave portion. As a result, the printing on the tire is not completely performed.

Therefore, Patent Document 1 discloses a marking head in which a bundle of needles are used as marking pins and the bundle of needles are inserted into a sheath using grease. In the marking head, the relative position between the needles changes so as to follow the uneven portion of the marking position. Thus, even when any uneven portion is present at the marking position, a desired mark is printed on the tire by the needles pressing the thermal transfer tape against the convex portion and the needles pressing the thermal transfer tape against the concave portion.

In the marking head of Patent Document 1, the adhesibility of grease is used to help the sheath to hold the bundle of needles. For this reason, when the marking pins are heated, the smooth grease is drooped and dropped from the needles to the tire, so that the tire or the mark is contaminated. Further, when the amount of grease inside the sheath decreases as the smooth grease is drooped and dropped, the needles slip out of the sheath, so that the complete printing may not be performed. In this way, in the marking head using grease, a problem arises in that the marking quality is degraded.

CITATION LIST

Patent Document

Patent Document 1: Japanese Patent No. 3330939

DISCLOSURE OF THE INVENTION

It is an object of the invention to provide a marking head and a marking device capable of preventing degradation in marking quality.

According to the invention, there is provided a marking head including: a tube-shaped casing of which both ends are opened; a plurality of pins which are received inside the casing so that the length direction thereof follows the axial direction of the casing and are respectively movable in a reciprocating manner in the axial direction; a heater which heats the plurality of pins; a thermal transfer tape which faces the plurality of pins in the axial direction; and an extruding member which extrudes the plurality of pins toward the thermal transfer tape so that the plurality of pins are pressed against the thermal transfer tape. Then, the casing includes an inner peripheral surface which is formed in a polygonal shape when viewed from the axial direction, and the plurality of pins are respectively arranged so as to take a posture parallel to the axial direction inside a region surrounded by the inner peripheral surface. In this arrangement, a plurality of rows of the pins arranged in a predetermined direction are arranged in a direction perpendicular to the row direction of the pins, the adjacent pins in the adjacent rows are respective offset from each other in the row direction of the pins, and each pin contacts the pins adjacent thereto.

DESCRIPTION OF EMBODIMENTS

Figure 1:
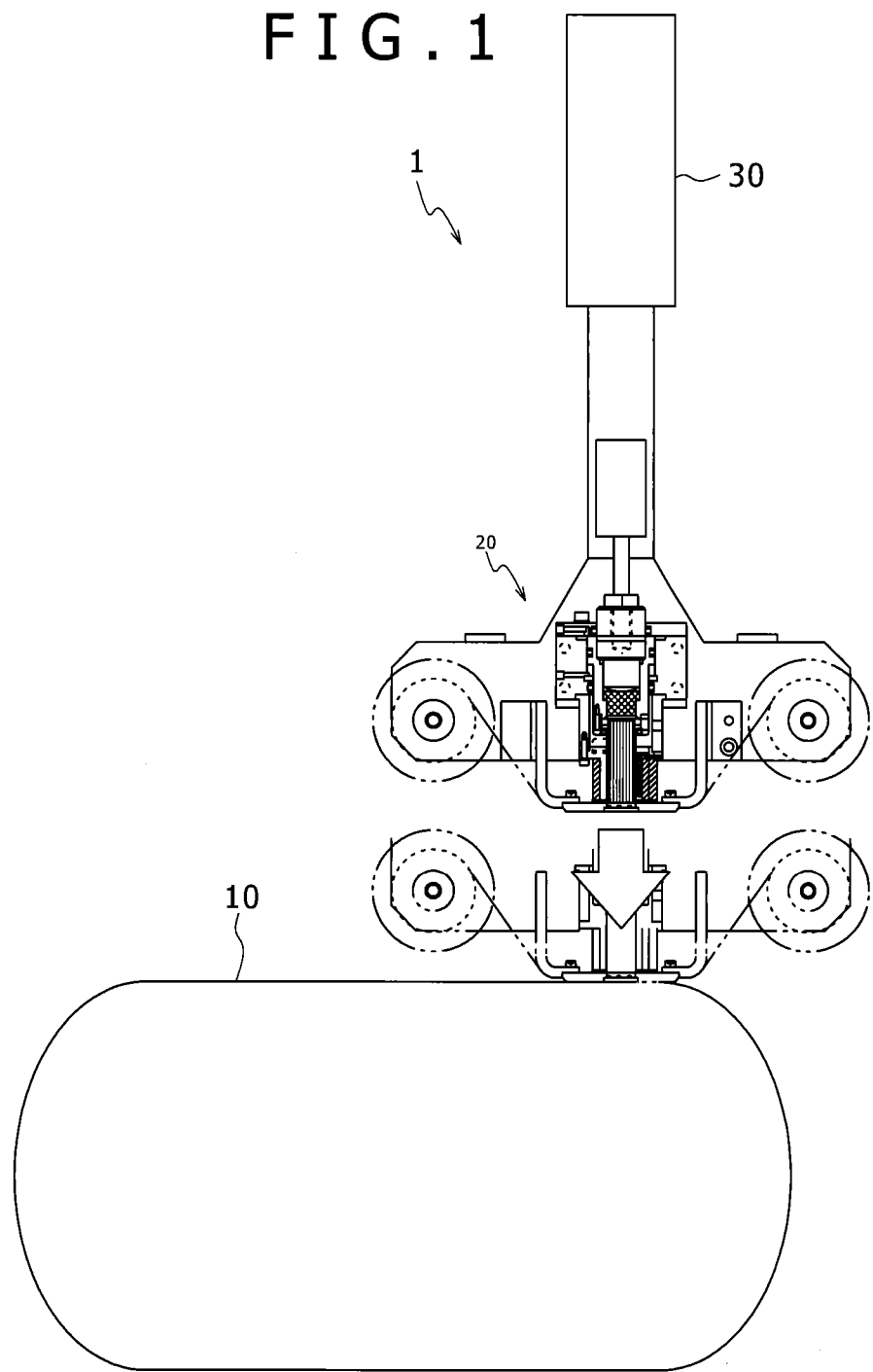
FIG. 1 is a side view illustrating a marking device.

Hereinafter, a preferred embodiment of the invention will be described by referring to the drawings.

(Configuration of Marking Device)

As illustrated in FIG. 1, a marking device 1 according to the embodiment includes a marking head 20 and an air cylinder (abutting unit) 30 which causes the marking head 20 to abut against a surface of a tire 10.

The tire 10 is subjected to various performance tests by a tire testing machine (not illustrated), and is delivered onto an exit conveyor (not illustrated) by a center conveyor (not illustrated). On the exit conveyor, the tire 10 takes a posture in which one side wall faces the upside.

The air cylinder 30 moves the marking head 20 upward or downward in the vertical direction by the telescopic movement thereof. Then, when performing marking on the side wall of the tire 10, the air cylinder 30 moves the marking head 20 downward in the vertical direction so that the marking head 20 abuts against the side wall of the tire 10.

(Configuration of Marking Head)

Figure 2:
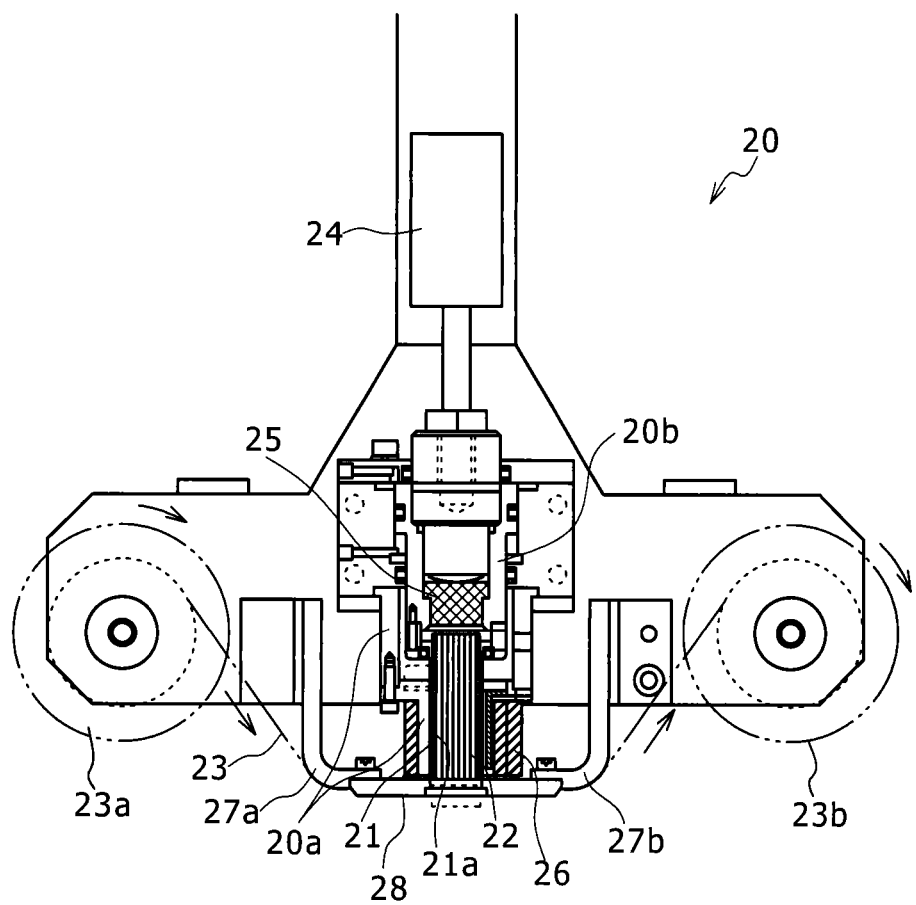
FIG. 2 is a side view illustrating a marking head of the marking device.

As illustrated in FIG. 2, the marking head 20 includes an inner casing (casing) 21, a plurality of pins 22, a heater 26 which heats the plurality of pins 22, a thermal transfer tape 23, an air cylinder (extruding member) 24 which presses the plurality of pins 22 toward the thermal transfer tape 23, and a rubber 25 which transmits a pressing force of the air cylinder 24 to the plurality of pins 22.

The inner casing 21 is made by steel, and has a tube-shaped shape of which the upper end and the lower end are opened. The inner casing 21 is disposed so that the axial direction thereof follows the vertical direction. The plurality of pins 22 are respectively received inside the inner casing 21. Each pin 22 has a length longer than that of the inner casing 21. Further, each pin 22 is a wire such as a piano wire having a circular cross-section of which the inner diameter is 0.6 to 0.8 mm, and the length direction thereof follows the vertical direction. That is, in the plurality of pins 22, the length direction follows the axial direction of the inner casing 21. Then, the plurality of pins 22 is respectively received inside the inner casing 21 so as to be movable in a reciprocating manner in the vertical direction. The heater 26 heats the plurality of pins 22 through the inner casing 21. Specifically, the heater 26 is provided in a periphery of an outer casing 20$a$ which holds the inner casing 21 in a sliding manner, and heats the plurality of pins 22 through the inner casing 21 and the outer casing 20a. The inner casing 21 is supported by an inner casing support member 20b so as to have a movable margin in the up to down direction. The inner casing support member 20b moves upward or downward by a distance longer than the movable margin of the inner casing 21 through the air cylinder 24. The rubber 25 is provided between the inner casing support member 20b and the plurality of pins 22 so as to face the upper end surfaces of the plurality of pins 22. It is desirable that the rubber 25 be formed of a material softer than the material of the tire 10.

The thermal transfer tape 23 is a taper coated with an ink which is transferred to a transfer subject by heat applied thereto. The thermal transfer tape 23 is wound on a supply reel 23a which is disposed at the left side of the outer casing 20a. The thermal transfer tape 23 is wound on a winding reel 23b when the winding reel 23b disposed at the right side of the outer casing 20a rotates in a direction indicated by the arrow. A pair of guide members 27a and 27b is provided between the supply reel 23a and the winding reel 23b. When the thermal transfer tape 23 is guided by the pair of guide members 27a and 27b, the tape faces the plurality of pins 22 in the vertical direction below the inner casing 21.

When the air cylinder 24 is lengthened, the inner casing support member 20b and the rubber 25 are pressed downward in the vertical direction along with the inner casing 21 and the plurality of pins 22. When the inner casing support member 20b is pressed downward until the movable margin of the inner casing 21 disappears, the rubber 25 abuts against the upper end surfaces of the plurality of pins 22. Here, since the inner casing support member 20b moves by a distance longer than the movable margin of the inner casing 21, the plurality of pins 22 are further pressed downward by the pressing force of the air cylinder 24. As a result, the plurality of pins 22 are extruded from the lower end of the inner casing 21 toward the thermal transfer tape 23, so that the plurality of heated pins 22 are pressed against the thermal transfer tape 23. Thus, a mark is printed on the side wall of the tire 10.

Figure 3A:
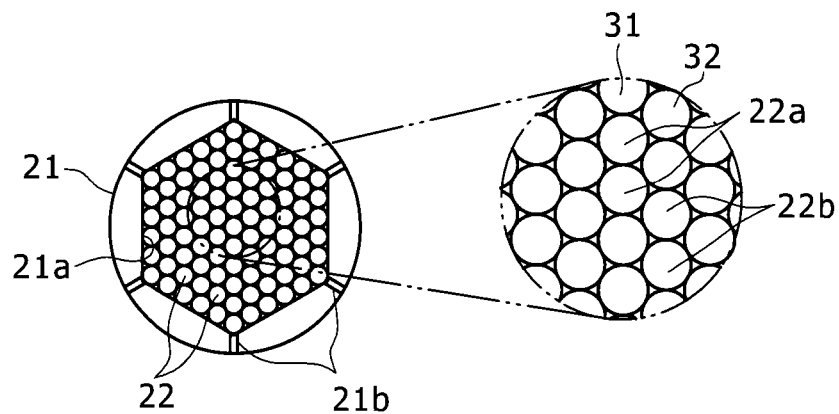
FIG. 3($a$) is a horizontal cross-sectional view of a periphery of an inner casing of the marking head, FIG. 3($b$) is a vertical cross-sectional view of the periphery of the inner casing, and FIG. 3($c$) is an external view of the inner casing.

As illustrated in FIG. 3(a), when the inner casing 21 is viewed from the axial direction, the outer peripheral surface has a circular shape, and the inner peripheral surface 21a has a regular hexagonal shape. The plurality of pins 22 are arranged inside the inner casing 21 according to the shape of the regular hexagonal inner peripheral surface 21a. In the embodiment, when viewed from the axial direction of the inner casing 21, the plurality of pins 22 are arranged in a zigzag shape. Specifically, the plurality of pins 22 are arranged so as to take a posture parallel to the axial direction in a region surrounded by the regular hexagonal inner peripheral surface 21a, and in this arrangement, a plurality of rows of the pins 22 arranged in a predetermined direction are arranged in a direction perpendicular to the row direction of the pins 22. Furthermore, the number of the rows of the pins 22 is not limited. The number of the rows of the pins 22 is determined in response to the size of the inner casing 21, the diameter of the pin 22, the number of the pins 22 received inside the inner casing 21, or the like.

Further, in the plurality of pins 22, the adjacent pins 22 in the adjacent rows are arranged so as to be offset from each other in the row direction of the pins 22. Specifically, pins 22a of a row 31 including the plurality of pins 22a in the up to down direction of the drawing paper and pins 22b of a row 32 including the plurality of pins 22b in the up to down direction of the drawing paper are arranged so as to be offset from each other in the arrangement direction (the up to down direction of the drawing paper) of the pins. That is, the pins are arranged in a zigzag shape. Thus, six pins 22, surrounding each pin 22 in the circumferential direction, contact the corresponding pin 22 at maximum. Here, in general, the mark printed on the tire 10 has a circular shape in many cases. Therefore, since the inner peripheral surface 21a of the inner casing 21 has a regular hexagonal shape, the mark becomes a quasi-circular shape. Further, when the inner peripheral surface 21a of the inner casing 21 has a regular hexagonal shape, the inner casing 21 may be easily processed.

Further, each pin 22 contacts the pins 22 adjacent thereto. Thus, a friction is generated between the adjacent pins 22. Furthermore, it is desirable that each pin 22 be nipped by at least two or more pins 22 adjacent thereto. Further, each pin 22 contacts six pins 22 adjacent thereto at maximum. Specifically, each pin 22 disposed near the center inside the inner casing 21 (other than the periphery) contacts six pins 22 surrounding the pin in the circumferential direction at maximum. Further, each of the pins 22 arranged along the inner peripheral surface 21a of the inner casing 21 (other than the corners) contacts four pins 22 adjacent thereto at maximum. Further, each of the pins 22 arranged in the corners of the inner peripheral surface 21a of the inner casing 21 contacts three pins 22 adjacent thereto at maximum. Since the contact area with the other pins 22 increases as the number of contact positions increases, the friction acting on each pin 22 further increases. In this way, the plurality of pins 22 are respectively arranged so as to take a posture parallel to the axial direction, and in this arrangement, a plurality of rows of the pins 22 arranged in a predetermined direction are arranged in a direction perpendicular to the row direction of the pins 22. Furthermore, the adjacent pins 22 in the adjacent rows are offset from each other in the row direction of the pin 22, and each pin 22 contacts the pins 22 adjacent thereto, so that the plurality of pins 22 are arranged in the densest state inside the inner casing 21.

Here, the size of the regular hexagonal shape as the shape of the inner peripheral surface 21a of the inner casing 21 is set based on the diameter of the received pin 22 or the number of the pins 22. Furthermore, it is assumed that the diameters of the respective pins 22 are constant. In FIG. 3(a), the number of the pins 22 is ninety one. Further, the number of the pins 22 disposed along the respective sides of the regular hexagonal shape is six. Furthermore, the number of the pins 22 is not limited thereto.

Figure 3B:
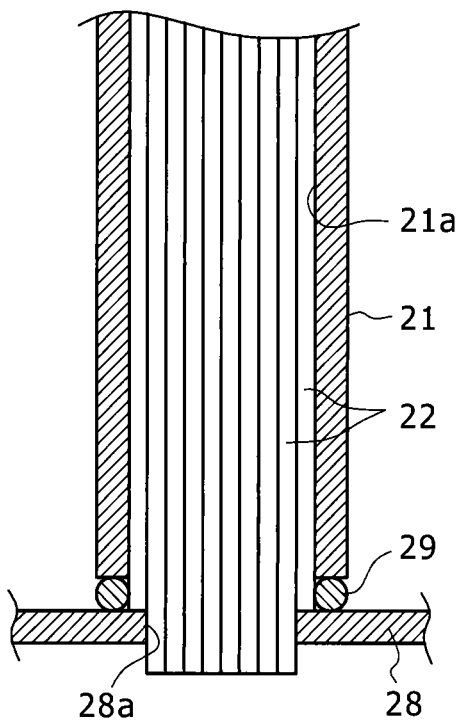

Further, as illustrated in FIG. 3(b), the marking head 20 includes a rubber band (binding member) 29 disposed below the inner casing 21 in the vertical direction. The rubber band 29 is an O-ring or the like. The rubber band 29 binds the plurality of pins 22 which protrude downward from the lower end of the inner casing 21. Thus, the friction generated between the adjacent pins 22 increases.

Further, the marking head 20 includes a plate 28. As illustrated in FIG. 2, the plate 28 is disposed between the inner casing 21 and the thermal transfer tape 23. As illustrated in FIG. 3(b), the plate 28 includes a hole 28a which is formed at a position facing the opening of the lower end of the inner casing 21 so that a part of the plurality of pins 22 may pass therethrough. The hole 28a is smaller than the opening of the inner casing 21, and is formed in a predetermined shape such as a circle, a triangle, and a square. When the plurality of pins 22 are extruded toward the thermal transfer tape 23, a part of the plurality of pins 22 are pressed against the thermal transfer tape 23 through the hole 28a. Meanwhile, the other pins 22 abut against the plate 28, so that the contact with the thermal transfer tape 23 is prevented. Thus, the shape of the hole 28a becomes the shape of the mark printed on the tire 10.

Figure 3C:
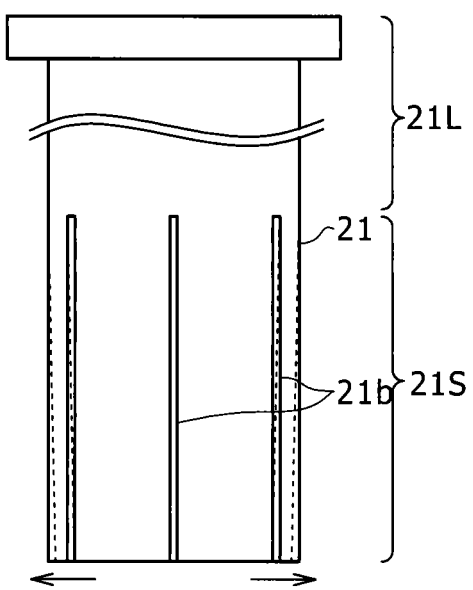

Further, as illustrated in FIG. 3(c), the marking head 20 includes a plurality of slits 21b which extend from the lower end of the inner casing 21 toward the upper end thereof. As illustrated in FIG. 3(a), the slits 21b are provided in the circumferential wall of the inner casing 21 at a gap in the circumferential direction. Specifically, each slit 21b is formed at each of six corners of the regular hexagonal shape as the shape of the inner peripheral surface 21a of the inner casing 21. Furthermore, the width of the slit 21b is smaller than the diameter of the pin 22. Then, the inner diameter of the portion (clamping portion) 21S provided with the slit 21b of the inner casing 21 in the axial direction is smaller than the inner diameter of the other portion (hereinafter, simply referred to as the "other portion") 21L of the inner casing 21. That is, in the inner casing 21, the inner diameter of the lower end portion (clamping portion) 21S is smaller than the inner diameter of the upper end portion (the other portion) 21L. Specifically, as indicated by the dotted line, the clamping portion 21S is bent toward the inside of the inner casing 21, so that the inner diameter of the lower end of the inner casing 21 becomes smaller than the inner diameter of the upper end of the inner casing 21. Then, when the plurality of pins 22 are received inside the inner casing 21, the portion provided with the slit 21b is elastically deformed outward, so that the lower end of the inner casing 21 is widened in a direction indicated by the arrow. That is, the clamping portion 21S is widened outward in the radial direction of the inner casing 21 by the plurality of pins 22 while the plurality of pins 22 are received inside the inner casing 21. At this time, the clamping portion 21S presses the plurality of pins 22 inward in the radial direction by a springing force generated by the widening of the plurality of pins 22. In this way, the entire bundle of the plurality of pins 22 is clamped from the outside by a force in which the lower end portion of the inner casing 21 will return to the original shape. As a result, the friction generated between the adjacent pins 22 and the friction generated between the pin 22 and the inner peripheral surface 21a of the inner casing 21 increase.

(Operation of Marking Device)

Next, a marking operation on the tire 10 using the marking device 1 will be described. Furthermore, the operations of respective components of the marking device 1 which will be described below are controlled by a controller (not illustrated) of a tire testing system including the marking device 1.

First, as illustrated in FIG. 1, the marking head 20 moves to the original position as the position above the marking position in the vertical direction as the air cylinder 30 is shortened. Subsequently, the tire 10 is delivered onto an exit conveyor (not illustrated) by a center conveyor (not illustrated).

Next, the marking head 20 moves downward to the marking position as the air cylinder 30 is lengthened. At the marking position, the marking head 20 contacts the tire 10. Specifically, the marking head 20 moves downward to a position (marking position) in which the thermal transfer tape 23 contacts the side wall of the tire 10.

Subsequently, as illustrated in FIG. 2, the rubber 25 is pressed downward from the original position in the vertical direction as the air cylinder 24 is lengthened. Thus, the rubber 25 presses the plurality of pins 22 downward, and a part of the plurality of heated pins 22 are extruded toward the thermal transfer tape 23 through the hole 28a of the plate 28. As a result, the thermal transfer tape 23 is brought into press-contact with the side wall of the tire 10 by a part of the plurality of heated pins 22.

Here, it is desirable that the material of the rubber 25 be softer than the material of the tire 10. In this case, even when an uneven portion is provided in the side wall of the tire 10, the plurality of pins 22 are divided into the pins causing the thermal transfer tape 23 to be brought into press-contact with the convex portion and the pins causing the thermal transfer tape 23 to be brought into press-contact with the concave portion in response to the uneven portion. Thus, the desired mark is reliably printed on the side wall of the tire 10.

As illustrated in FIG. 3(a), the plurality of pins 22 are arranged in the densest state inside the inner casing 21 of which the inner peripheral surface 21a has a regular hexagonal shape. That is, the plurality of pins 22 are respectively arranged inside a region surrounded by the inner peripheral surface 21a so as to take a posture parallel to the axial direction, and in this arrangement, a plurality of rows of the pins 22 arranged in a predetermined direction are arranged in a direction perpendicular to the row direction of the pins 22. Furthermore, the adjacent pins 22 in the adjacent rows are offset from each other in the row direction of the pins 22, and each pin 22 contacts the pins 22 adjacent thereto. Thus, the contact area between each pin 22 and the other pins 22 increases, and the friction acting on the pin 22 increases. Specifically, each pin 22 contacts six pins 22 adjacent thereto at maximum so that the pin is surrounded by the adjacent pins in the circumferential direction. Here, since the contact area with the other pins 22 increases as the number of contact positions increases, the friction acting on each pin 22 further increases. Accordingly, even when grease or the like is not used, the pin 22 may not easily slip out of the inner casing 21. Further, since grease or the like is not used, no contamination occurs in the tire 10 or the mark due to the grease drooped from the pin.

Further, as illustrated in FIG. 3(b), the plurality of pins 22 are bound by the rubber band 29. Thus, the friction generated between the adjacent pins 22 increases. Further, as illustrated in FIG. 3(c), the inner casing 21 is provided with the slit 21b. As indicated by the dotted line in FIG. 3(c), the clamping portion 21S provided with the slit 21b is bent inward, so that the inner diameter of the lower end becomes smaller than the inner diameter of the upper end while the plurality of pins 22 are not received inside the inner casing 21. For this reason, the plurality of pins 22 are received inside the inner casing 21, and the inward bent portion is elastically deformed toward the outside (a position indicated by the solid line), so that a force (springing force) for causing the elastically deformed portion to return to the originally inward bent state is generated. At this time, the plurality of pins 22 is pressed inward in the radial direction of the inner casing 21 by the springing force. That is, the entire bundle of the plurality of pins 22 is clamped by the clamping portion 21S from the outside. Thus, the friction generated between the adjacent pins 22 increases.

Further, as illustrated in FIG. 3(b), a part of the plurality of pins 22 are pressed against the thermal transfer tape 23 through the hole 28a formed in the plate 28. Accordingly, only the pins 22 passing through the hole 28a serve as the marking pins. Thus, the mark formed in response to the shape of the hole 28a is printed on the side wall of the tire 10.

When the mark is printed on the side wall of the tire 10 as described above, the air cylinder 24 is shortened as illustrated in FIG. 2. Then, the plurality of pins 22 are pressed back upward in the vertical direction by the reaction force of the tire 10 which is released from the force for pressing the plurality of pins 22 against the tire 10. For this reason, the inner casing support member 20b moves upward as the air cylinder 24 is shortened. Thus, all pins 22 passing through the hole 28a move upward in relation to the plate 28. Further, the rubber 25 returns to the original position.

Subsequently, as illustrated in FIG. 1, the marking head 20 returns to the original position above the marking position in the vertical direction as the air cylinder 30 is shortened. Then, as illustrated in FIG. 2, the thermal transfer tape 23 is wound on the winding reel 23b by a predetermined amount in a manner such that the winding reel 23b rotates in a direction indicated by the arrow. Thus, the preparation of the marking operation for the next tire 10 is completed. Then, the above-described operations are repeated.

(Effect)

As described above, according to the marking head 20 of the embodiment, the plurality of pins 22 are respectively arranged so as to take a posture parallel to the axial direction inside the inner casing 21 of which the inner peripheral surface 21a has a regular hexagonal shape, and in this arrangement, a plurality of rows of the pins 22 arranged in a predetermined direction are arranged in a direction perpendicular to the row direction of the pins 22. Furthermore, the adjacent pins 22 in the adjacent rows are offset from each other in the row direction of the pin 22, and each pin contacts the pins adjacent thereto, so that the friction acting on each pin 22 increases. Thus, even when grease or the like is not used, the pin 22 may not easily slip out of the inner casing 21. Further, since grease or the like is not used, no contamination occurs in the tire 10 or the mark due to the grease drooped from the pin 22. Accordingly, degradation in marking quality is prevented.

Further, each pin 22 has a circular cross-section, and the inner periphery 21a of the inner casing 21 has a hexagonal shape. For this reason, the plurality of pins 22 is arranged inside the inner casing 21 so as to take a posture parallel to the axial direction. In this arrangement, a plurality of rows of the pins 22 arranged in a predetermined direction is arranged in a direction perpendicular to the row direction of the pins 22. Furthermore, the adjacent pins 22 in the adjacent rows are offset from each other in the row direction of the pins 22, and each pin contacts the pins adjacent thereto, so that each pin 22 contacts six pins 22 adjacent thereto at maximum so as to be surrounded by the pins in the circumferential direction. Thus, the friction acting on each pin 22 further increases. This is because the contact area with the other pins 22 increases as the number of contact positions increases. Further, the mark generally has a circular shape in many cases. Therefore, since the inner peripheral surface 21a of the inner casing 21 has a hexagonal (polygonal) shape when viewed from the axial direction, the mark may be formed in a quasi-circular shape. Further, since the inner peripheral surface 21a of the inner casing 21 has a hexagonal shape, the inner casing 21 may be comparatively easily processed.

Further, since the binding member such as the rubber band 29 binds the plurality of pins 22, the friction generated between the adjacent pins 22 increases. Further, the inner diameter of the clamping portion 21S provided with the plurality of slits 21b in the inner casing 21 is smaller than the inner diameter of the other portion 21L, and the clamping portion 21S is widened outward in the radial direction of the inner casing 21 by the plurality of pins 22 while the plurality of pins 22 are received inside the inner casing 21. Furthermore, the plurality of pins 22 are pressed inward in the radial direction by the springing force generated with the widening. Thus, the friction generated between the adjacent pins 22 increases.

Further, when the plurality of pins 22 are extruded toward the thermal transfer tape 23, a part of the plurality of pins 22 are pressed against the thermal transfer tape 23 passing through the hole 28a formed in the plate 28. Meanwhile, since the other pins 22 abut against the plate 28, the other pins are not pressed against the thermal transfer tape 23. Accordingly, only the pins 22 passing through the hole 28a serve as the marking pins. Thus, the mark formed in response to the shape of the hole 28a is printed on the tire 10. Then, since the shape of the hole 28a becomes a desired shape such as a circle, a triangle, and a square, the mark with a desired shape is printed on the tire 10.

(Modified Example of Embodiment)

While the embodiment of the invention has been described above, these are merely specific examples. In particular, the invention is not limited to the embodiment, and the specific configuration and the like may be appropriately modified in design. Further, the operation and the effect described in the invention are merely the operation and the effect which are most appropriately obtained by the invention, and the operation and the effect obtained by the invention are not limited to the embodiment of the invention.

The specific cross-sectional shape of the pin 22 is not limited. The pin 22 of the embodiment has a circular cross-section, but may have, for example, a hexagonal cross-section. In this case, a plurality of pins 22 each having a hexagonal pillar shape are arranged inside the inner casing 21 without any gap as in the honeycomb structure. Thus, the contact area between the adjacent pins 22 increases compared to the case where the pin 22 has a circular cross-section. Accordingly, since the friction generated between the adjacent pins 22 further increases, the pin 22 may not easily slip out of the inner casing 21 compared to the case where the cross-section is circular.

Further, the specific shape of the inner peripheral surface 21a of the inner casing 21 when viewed from the axial direction is not limited. The inner peripheral surface of the inner casing 21 of the embodiment has a regular hexagonal shape, but may have, for example, an octagonal shape if each pin 22 may be disposed so as to contact the pins 22 adjacent thereto. That is, the geometrical shape of the inner peripheral surface 21a of the inner casing 21 may be a polygonal shape other than the regular hexagonal shape when viewed from the axial direction.

Further, the clamping portion 21S of the inner casing 21 is bent toward the inside of the inner casing 21 so that the inner diameter of the lower end of the inner casing 21 becomes smaller than the inner diameter of the upper end, but the invention is not limited to the configuration. That is, the inner casing 21 may have any configuration in which the inner diameter of the clamping portion 21S provided with the slit 21b is smaller than the inner diameter of the other portion 21L, and the clamping portion 21S provided with the slit 21b may be deformed so as to be curved toward the inside of the inner casing 21.

[Outline of Embodiment]

The above-described embodiment may be summarized as below.

According to the embodiment, there is provided a marking head including: a tube-shaped inner casing of which both ends are opened; a plurality of pins which are received inside the inner casing so that the length direction thereof follows the axial direction of the inner casing and are respectively movable in a reciprocating manner in the axial direction; a heater which heats the plurality of pins; a thermal transfer tape which faces the plurality of pins in the axial direction; and an extruding member which extrudes the plurality of pins toward the thermal transfer tape so that the plurality of pins are pressed against the thermal transfer tape. Then, the inner casing includes an inner peripheral surface which is formed in a polygonal shape when viewed from the axial direction, and the plurality of pins are respectively arranged so as to take a posture parallel to the axial direction inside a region surrounded by the inner peripheral surface. In this arrangement, a plurality of rows of the pins arranged in a predetermined direction are arranged in a direction perpendicular to the row direction of the pins, the adjacent pins in the adjacent rows are respective offset from each other in the row direction of the pins, and each pin contacts the pins adjacent thereto.

According to such a configuration, the plurality of pins are arranged so as to take a posture parallel to the axial direction inside the inner casing of which the inner peripheral surface has a hexagonal shape. In this arrangement, a plurality of rows of the pins arranged in a predetermined direction is arranged in a direction perpendicular to the row direction of the pins. Furthermore, the adjacent pins in the adjacent rows are respectively offset from each other in the row direction of the pins, and each pin contacts the pins adjacent thereto, so that the friction acting on each pin increases. Thus, even when grease or the like is not used, the pin may not easily slip out of the inner casing. Further, since grease or the like is not used, no contamination occurs in the tire or the mark due to the grease drooped from the pins. Accordingly, degradation in marking quality is prevented.

Further, in the marking head according to the embodiment, each pin may have a circular cross-section in a direction perpendicular to the axial direction, and the inner peripheral surface of the inner casing may be formed in a hexagonal shape when viewed from the axial direction.

According to such a configuration, when each pin has a circular cross-section and the inner peripheral surface of the inner casing has a hexagonal shape, the plurality of pins are arranged inside the inner casing so as to take a posture parallel to the axial direction. In this arrangement, a plurality of rows of the pins arranged in a predetermined direction is arranged in a direction perpendicular to the row direction of the pins. Furthermore, the adjacent pins in the adjacent rows are offset from each other in the row direction of the pins, and each pin contacts six pins at maximum surrounding the corresponding pin in the circumferential direction while each pin contacts the pins adjacent thereto. Thus, the friction acting on each pin further increases. Further, since the mark generally has a circular shape in many cases, the mark may be formed in a quasi-circular shape when the inner peripheral surface of the inner casing has a hexagonal shape. Further, when the inner peripheral surface of the inner casing has a hexagonal shape, the inner casing may be comparatively easily processed.

Further, the marking head according to the embodiment may further include a binding member that binds the plurality of pins.

According to such a configuration, since the plurality of pins is bound, the friction generated between the adjacent pins increases.

Further, the casing of the marking head may include a plurality of slits which extend in a circumferential wall including the inner peripheral surface in the axial direction from one end of the circumferential wall toward the other end thereof and are provided at a gap in the circumferential direction of the circumferential wall, the inner diameter of a clamping portion as a portion provided with the plurality of slits of the casing in the axial direction may be smaller than the inner diameter of the other portion, the clamping portion may be widened outward in the radial direction of the casing by the plurality of pins while the plurality of pins are received inside the casing, and the plurality of pins may be pressed inward in the radial direction by a springing force generated with the widening.

Even in such a configuration, the friction generated between the adjacent pins increases.

Further, the marking head according to the embodiment may further include a plate which is provided between the casing and the thermal transfer tape and is provided with a hole formed in a predetermined shape so that a part of the plurality of pins passes therethrough.

According to such a configuration, when the plurality of pins is extruded toward the thermal transfer tape, a part of the plurality of pins is pressed against the thermal transfer tape passing through the hole formed in the plate. Meanwhile, since the other pins abut against the plate, the other pins are not pressed against the thermal transfer tape. Accordingly, only the pins passing through the hole serve as the marking pins. Thus, the mark in response to the shape of the hole formed in the plate is printed on the tire. Then, since the shape of the hole becomes a desired shape such as a circle, a triangle, and a square, the mark with a desired shape is printed on the tire.

Further, the marking device according to the embodiment includes any marking head described above and an abutting member that causes the marking head to abut against a surface of a tire.

According to such a configuration, it is possible to obtain the marking device which may not cause degradation in marking quality.

Industrial Applicability

As described above, the marking head and the marking device according to the invention may be effectively used to perform marking on the tire subjected to the tire performance test and may appropriately prevent degradation in marking quality.

The invention claimed is:

1. A marking head comprising:
a tube-shaped casing of which both ends are opened;
a plurality of pins which are received inside the casing so that the length direction thereof follows the axial direction of the casing and are respectively movable in a reciprocating manner in the axial direction;
a heater which heats the plurality of pins;
a thermal transfer tape which faces the plurality of pins in the axial direction; and
an extruding member which extrudes the plurality of pins toward the thermal transfer tape so that the plurality of pins are pressed against the thermal transfer tape,
wherein the casing includes an inner peripheral surface which is formed in a polygonal shape when viewed from the axial direction,
wherein the plurality of pins are respectively arranged so as to take a posture parallel to the axial direction inside a region surrounded by the inner peripheral surface, and
wherein in this arrangement, a plurality of rows of the pins arranged in a predetermined direction are arranged in a direction perpendicular to the row direction of the pins, the adjacent pins in the adjacent rows are respective offset from each other in the row direction of the pins, and each pin contacts the pins adjacent thereto.

2. The marking head according to claim 1,
wherein each pin has a circular cross-section in a direction perpendicular to the axial direction, and
wherein the inner peripheral surface of the casing is formed in a hexagonal shape when viewed from the axial direction.

3. The marking head according to claim 1, further comprising:
a binding member that binds the plurality of pins.

4. The marking head according to claim 1,
wherein the casing includes a plurality of slits which extend in a circumferential wall including the inner peripheral surface in the axial direction from one end of the circumferential wall toward the other end thereof and are provided at a gap in the circumferential direction of the circumferential wall, wherein the inner diameter of a clamping portion as a portion provided with the plurality of slits of the casing in the axial direction is smaller than the inner diameter of the other portion, and wherein the clamping portion is widened outward in the radial direction of the casing by the plurality of pins while the plurality of pins are received inside the casing and the plurality of pins are pressed inward in the radial direction by a springing force generated with the widening.

5. The marking head according to claim 1, further comprising:
a plate which is provided between the casing and the thermal transfer tape and is provided with a hole formed in a predetermined shape so that a part of the plurality of pins passes therethrough.

6. A marking device comprising:
the marking head according to claim 1; and
an abutting member that causes the marking head to abut against a surface of a tire.

* * * * *